US012697916B2

(12) United States Patent
da Rosa

(10) Patent No.:  US 12,697,916 B2
(45) Date of Patent:       Aug. 4, 2026

(54) BUSHING AND BELT TENSION SYSTEM FOR CAPTIVE BEAM SYSTEM

(71) Applicant: Ancra International LLC, Azusa, CA (US)

(72) Inventor: Joaquim Carlos da Rosa, Independence, KY (US)

(73) Assignee: Ancra International LLC, Azusa, CA (US)

( * ) Notice: Subject to any disclaimer, the term of this patent is extended or adjusted under 35 U.S.C. 154(b) by 1030 days.

(21) Appl. No.: 17/791,403

(22) PCT Filed: Jan. 12, 2021

(86) PCT No.: PCT/US2021/013061
§ 371 (c)(1),
(2) Date: Jul. 7, 2022

(87) PCT Pub. No.: WO2021/146179
PCT Pub. Date: Jul. 22, 2021

(65) Prior Publication Data
US 2023/0029985 A1     Feb. 2, 2023

Related U.S. Application Data

(60) Provisional application No. 62/962,591, filed on Jan. 17, 2020.

(51) Int. Cl.
*B60P 7/08*        (2006.01)
*B60P 7/15*        (2006.01)

(52) U.S. Cl.
CPC .............. *B60P 7/0815* (2013.01); *B60P 7/15* (2013.01)

(58) Field of Classification Search
CPC .. B60P 7/0815; B60P 7/15; B60P 1/02; B60P 7/135; B60P 1/4421; B60P 3/08;
(Continued)

(56) References Cited

U.S. PATENT DOCUMENTS 5,104,269 A * 4/1992 Hardison .................. B60P 7/15
                                              410/149
8,459,916 B2 * 6/2013 Widynowski ............. B60P 7/15
                                              410/152
(Continued)

FOREIGN PATENT DOCUMENTS

EP            1 396 384 A1      3/2004

OTHER PUBLICATIONS

International Search Report and Written Opinion from corresponding International Application No. PCT/US2021/013061, Jun. 10, 2021, 13 pp.
(Continued)

*Primary Examiner* — Stephen T Gordon
(74) *Attorney, Agent, or Firm* — Shook, Hardy & Bacon L.L.P.

(57)            ABSTRACT

This disclosure provides a bushing for a captive beam system, and specifically a bushing that extends between a track for a captive beam system and a bracket that slides along the track. In some captive beam systems that have automatic moving capability, the bracket (and therefore the captive beam that is rotatably connected to the bracket) is pulled upward or downward by a force applied thereto either directly or indirectly, and this force may result in some rubbing between the bracket and the track, which introduces the possibility of wear. The bushing is provided as a wear surface to prevent track or bracket wear. The disclosure also provides a tensioning system for an automatically movable captive beam.

7 Claims, 19 Drawing Sheets

(58) Field of Classification Search
CPC ..... B60P 7/14; B61D 3/02; B61D 3/04; F16C
29/005; F16C 29/02
USPC ......... 410/89, 104, 126, 130, 132, 139, 150;
105/370–372, 375; 296/22.44, 184.1;
384/47; 248/602
See application file for complete search history.

(56)                    References Cited

U.S. PATENT DOCUMENTS

| | | | |
|---|---|---|---|
| 9,522,694 B2 | 12/2016 | Caverly | |
| 9,975,465 B2 | 5/2018 | Rasmussen | |
| 2011/0318133 A1* | 12/2011 | Arnold | B60P 7/15 |
| | | | 410/150 |
| 2014/0314534 A1 | 10/2014 | Ablabutyan | |
| 2019/0270400 A1 | 9/2019 | Da Rosa | |

OTHER PUBLICATIONS

Office Action for Mexican Patent Application No. MX/A/2022/008841, mailed on Jun. 24, 2025, dated Jun. 13, 2025, 7 pages (3 pages of English Translation and 4 pages of Original Copy).

International Preliminary Report on Patentability received for PCT Patent Application No. PCT/US2021/013061, mailed on Jul. 28, 2022, 10 pages.

Office Action received for Canadian Patent Application No. 3162967, mailed on Nov. 29, 2023, 6 pages.

Office Action received for European Application No. 21704634.1, mailed on Jan. 22, 2024, 4 pages.

Office Action received for European Application No. 21704634.1, mailed on May 27, 2024, 6 pages.

* cited by examiner

BUSHING AND BELT TENSION SYSTEM FOR CAPTIVE BEAM SYSTEM

RELATED APPLICATIONS

The present patent document is a § 371 filing based on PCT Application Serial No. PCT/US2021/013061, filed Jan. 12, 2021 (and published as WO 2021/146179 A1 on Jul. 22, 2021), designating the United States and published in English, which claims the benefit of the filing date under 35 U.S.C. § 119(e) of U.S. Provisional Patent Application Ser. No. 62/962,591, filed Jan. 17, 2020. All of the foregoing applications are hereby incorporated by reference in their entirety.

PRIORITY CLAIM

This invention claims the benefit of priority of U.S. Provisional Application Ser. No. 62/962,591, entitled "Bushing and Belt Tension System for Captive Beam System," filed Jan. 17, 2020, which is hereby incorporated by reference in its entirety.

TECHNICAL FIELD

The present disclosure relates to a bushing component and a belt tension system that may be used in various captive beam systems, such as remotely adjustable captive beam systems. Captive beam systems include decking beams with components that slide within vertical tracks fixed to opposite walls of a cargo compartment. The beam can be stowed close to the ceiling of the cargo compartment when not needed for use, and can be selectively lowered to a position for loading cargo or for shoring purposes. The ends of the beams slide within the tracks and include locking features that can selectively position the ends of the beams with respect to the tracks at various heights along the tracks. The adjustment of height of captive beams may be automatically controlled to allow a single operator to efficiently load or unload a cargo compartment.

BRIEF SUMMARY OF THE INVENTION

A first representative embodiment of the disclosure is provided. The embodiment includes a remotely adjustable decking system. The system includes a vertical track configured to be installed upon a wall of a cargo compartment and a bracket that is configured to slide along the vertical track. A pulley system is operatively engaged with the bracket through a belt drive system including a belt. A tension system is configured for selectively adjusting tension of the belt of the belt drive system.

Another representative embodiment of the disclosure is provided. The embodiment includes a remotely adjustable decking system. The system includes a vertical track configured to be installed upon a wall of a cargo compartment. The vertical track includes a middle panel connected to a first side panel and a second side panel. The middle panel includes a first edge extending outwardly from the first side panel and a second edge extending outwardly from the second side panel. A bracket is configured to slide along the vertical track. The bracket includes a first groove configured for slidably receiving the first edge of the middle panel of the vertical track and a second groove configured for slidably receiving the second edge of the middle panel of the vertical track. A first bushing component is disposed in the first groove of the bracket and configured for slidably receiving at least a portion of the first edge of the middle panel of the vertical track. A second bushing component disposed in the second groove of the bracket and configured for slidably receiving at least a portion of the second edge of the middle panel of the vertical track.

Another representative embodiment of the disclosure is provided. The embodiment includes a bushing component for reducing wear in a remotely adjustable decking system, including a vertical track configured to be installed upon a wall of a cargo compartment and a bracket configured to slide along the vertical track. The bushing component includes an elongated portion extending between a first end and a second end, a first curved portion connected to the first end, and a second curved portion connected to the second end. The bushing component is configured to be disposed in a groove of a bracket and configured for slidably receiving at least a portion of a vertical track slidably received in the groove of the bracket.

Other systems, methods, features and advantages of the invention will be, or will become, apparent to one with skill in the art upon examination of the following figures and detailed description. It is intended that all such additional systems, methods, features, and advantages be within the scope of the invention, and be encompassed by the following claims.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like-referenced numerals designate corresponding parts throughout the different views.

DETAILED DESCRIPTION

Figure 1:
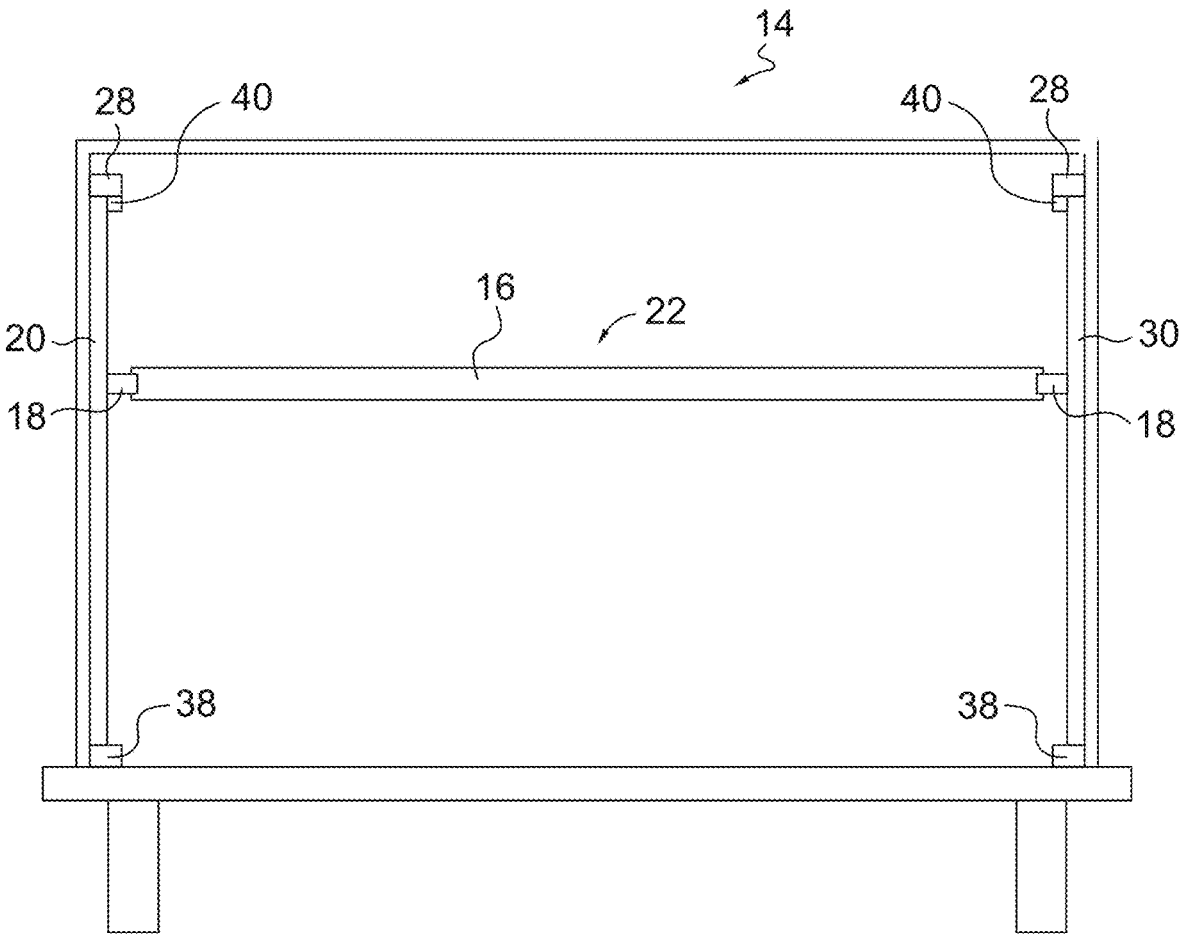
FIG. 1 is a schematic rear view of a captive beam system connected to opposite sidewalls of a cargo compartment, such as a trailer, in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional material, construction, and assembly.

A bushing component 10 and a belt tension system 12 for use with a captive beam system, such as a remotely adjustable decking system 14, is shown in FIGS. 1-19. Referring to FIGS. 1-4, the remotely adjustable decking system 14 may include first and second tracks 20, 30 that are disposed upon opposite sides of a cargo compartment and may also include a beam assembly 22 extending between the first and second tracks 20, 30. The beam assembly 22 may include an elongate beam 16, and two collars 18, which may be telescopingly mounted to the beam 16 to allow the length of the beam 16 to selectively extend (when the beam is at an angle) and shorten (when the beam is horizontal). Each collar 18 may be connected to a bracket 24, such as with a pinned connection or other types of connections. The collar 18 may be pivotable with respect to the bracket 24.

Figure 2:
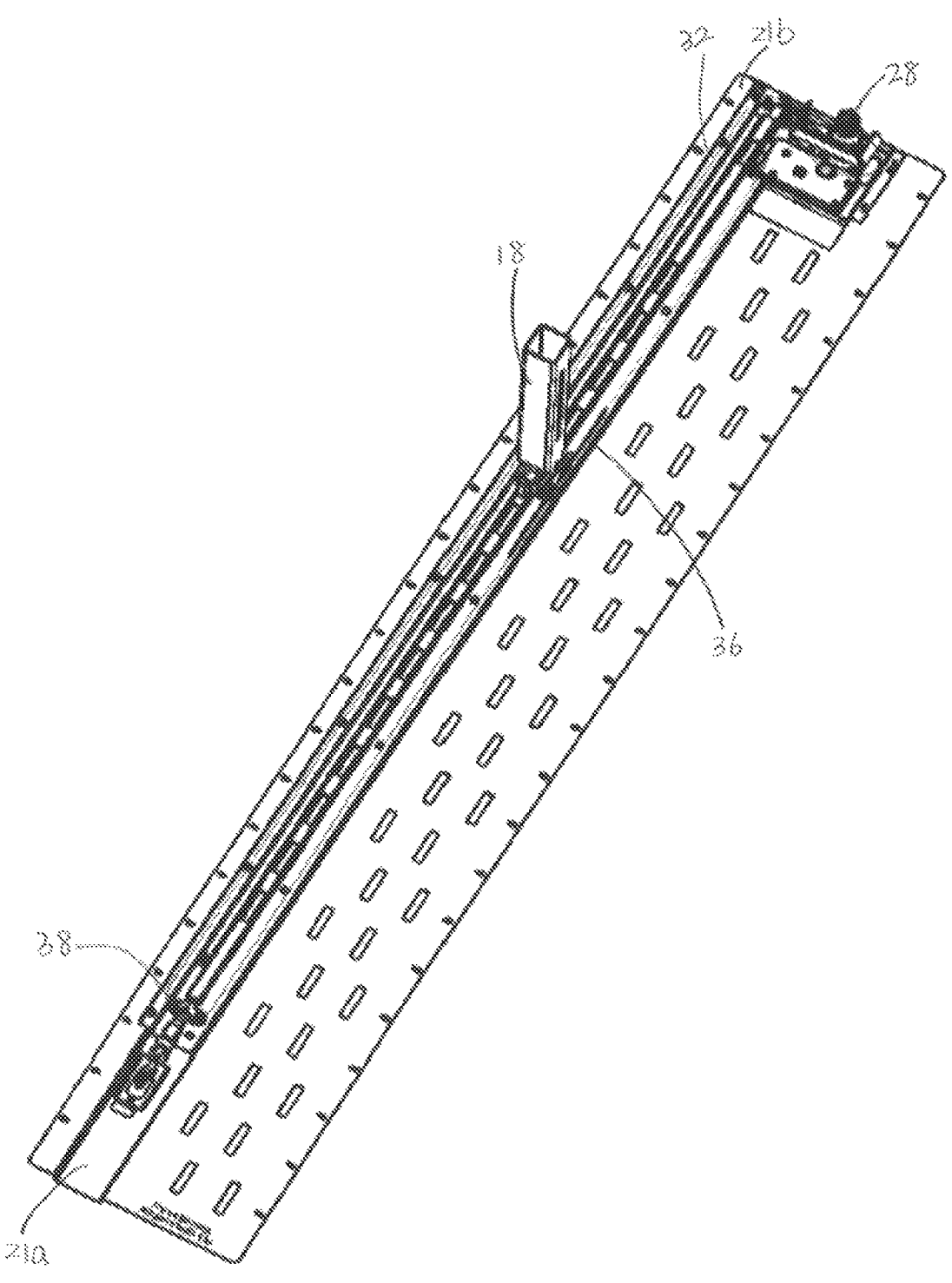
FIG. 2 is a perspective view of one track and a collar assembly (collar, bracket, latch) connected to an aperture in the track, schematically depicting a belt drive system disposed between a set of pulleys and fixed with respect to the bracket in accordance with certain aspects of the present disclosure.
Figure 2A:
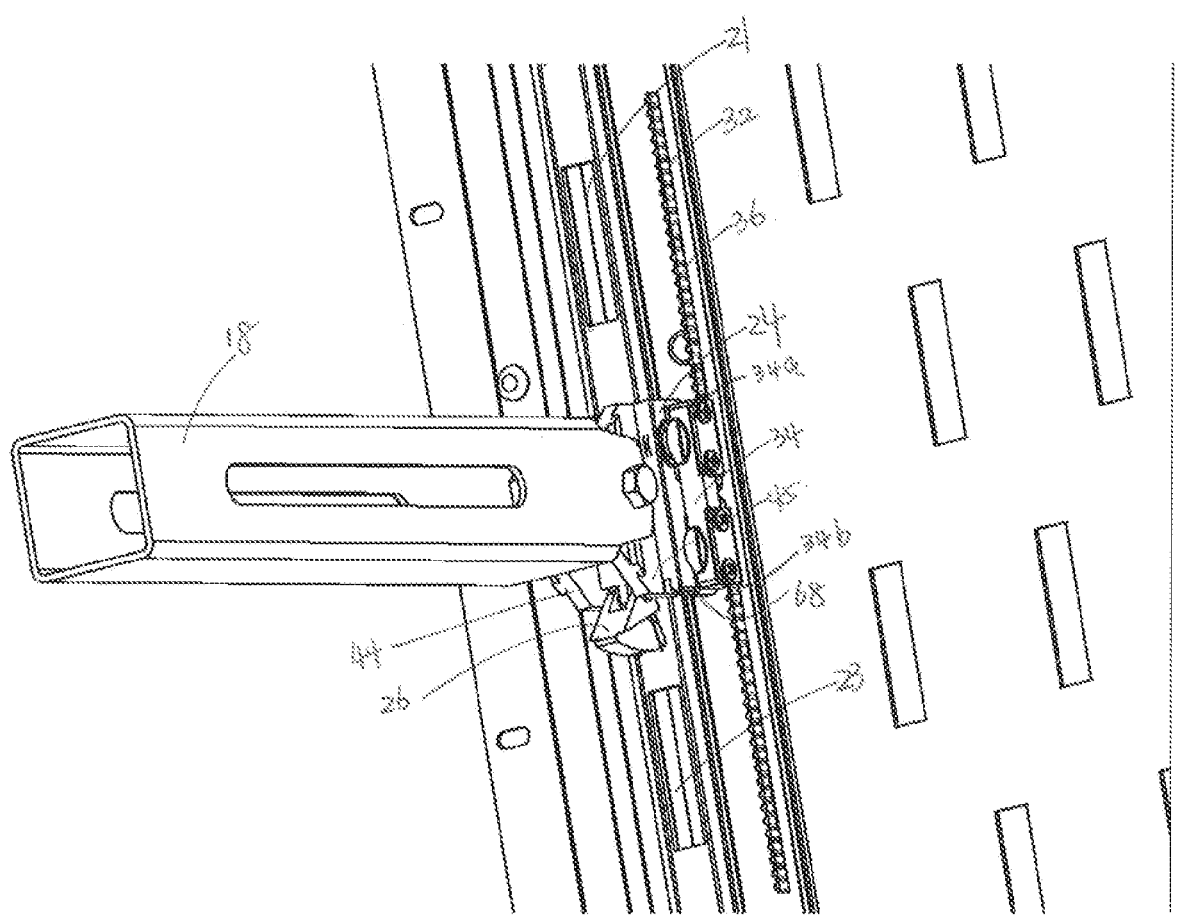
FIG. 2A is a perspective view of an embodiment of the bracket coupled to the belt of the belt drive system in accordance with certain aspects of the present disclosure.

Each bracket 24 may include a latch system 26 (e.g., as shown in FIG. 2A) that may slide along the corresponding track to maintain the connection between the bracket 24 and the track 20, 30 along the length of the track 20, 30 (i.e. when the beam assembly 22 is secured at a selected position corresponding to an aperture in the track 20, 30 and when the beam assembly 22 is stowed near the ceiling of the cargo compartment when not in use). Example configurations of the latch system 26 and methods of using the latch system 26 to automatically adjust the position of the beam assembly 22 with respect to the tracks 20, 30 are described in U.S. non-provisional application Ser. No. 16/285,949, titled "REMOTELY ADJUSTABLE CAPTIVE BEAM SYSTEM," filed Feb. 26, 2019, which is hereby incorporated by reference in its entirety.

Figure 2B:
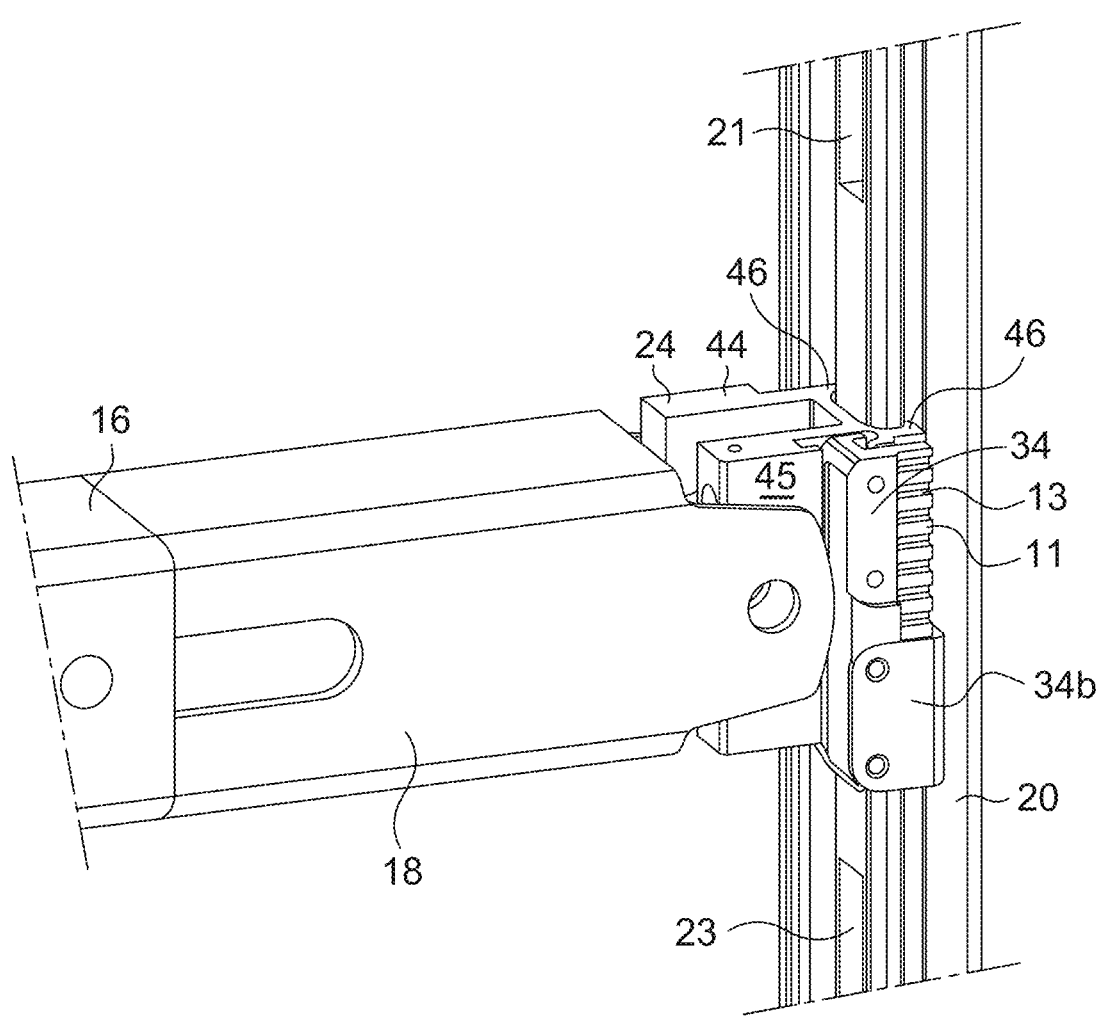
FIG. 2B is a perspective view of another embodiment of the bracket upon the track with the belt removed but when installed the teeth of the belt are engageable with the peaks and valleys of the side wall of the bracket.
Figure 3:
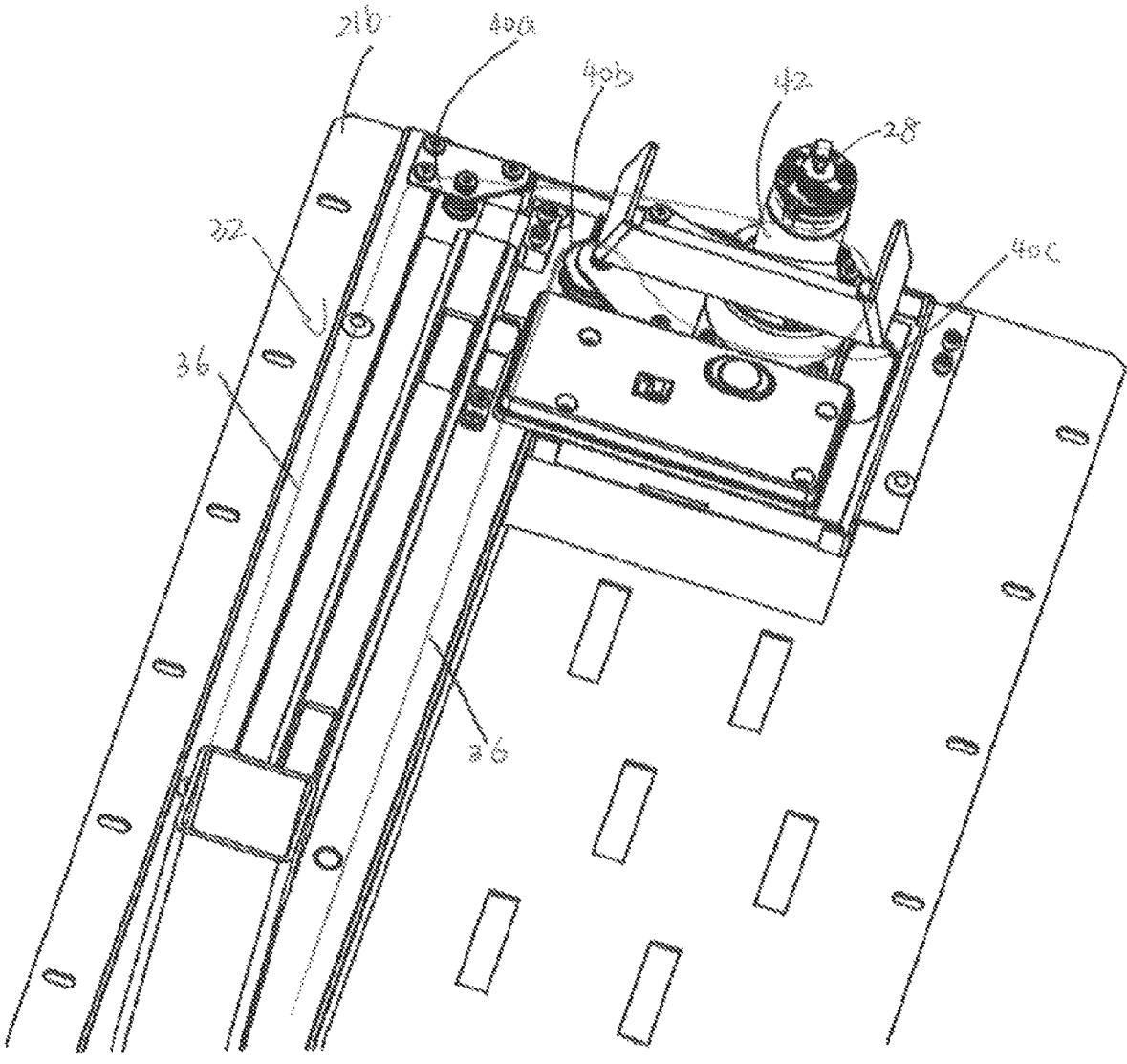
FIG. 3 is an enlarged partial perspective view of a portion of the belt drive system of FIG. 2, schematically depicting the belt wrapping around the upper pulleys in accordance with certain aspects of the present disclosure.
Figure 4:
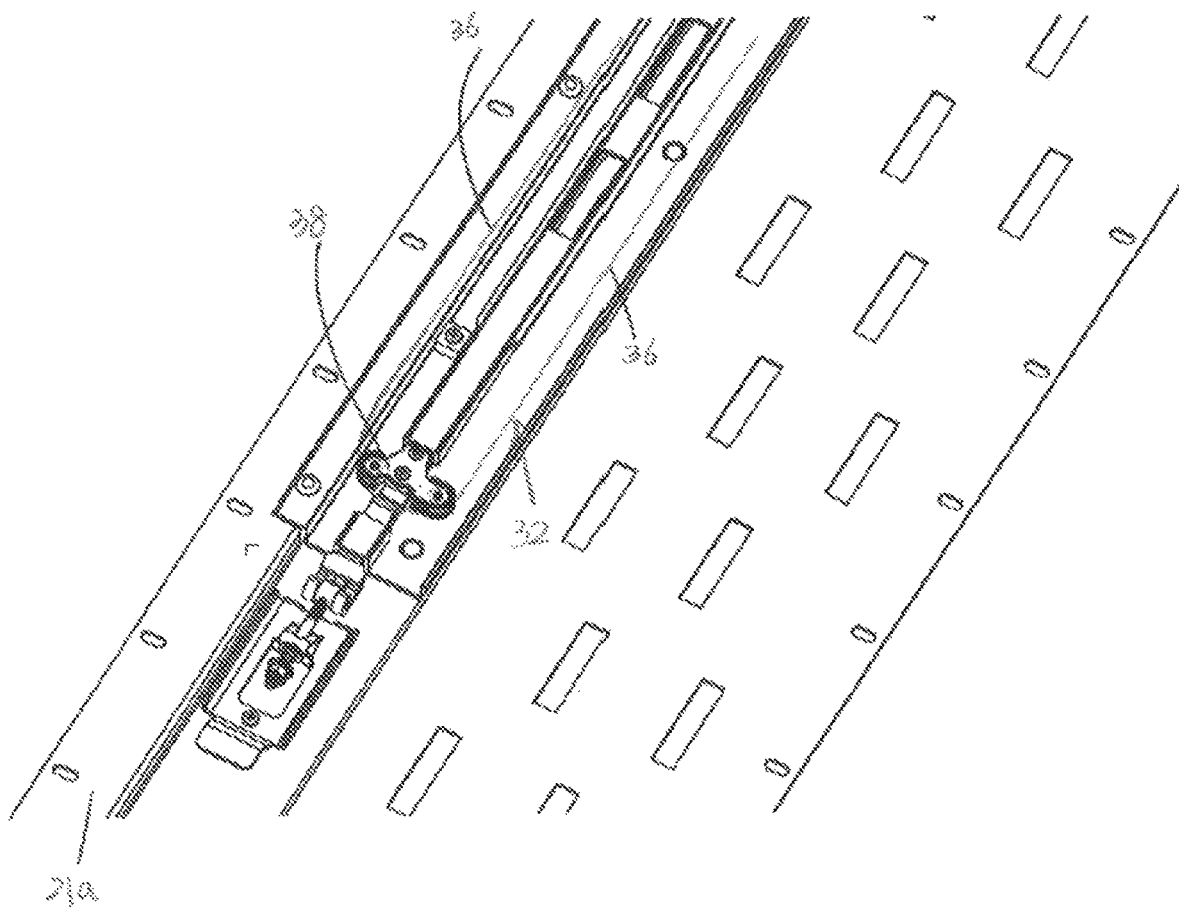
FIG. 4 is an enlarged partial perspective view of a portion of the belt drive system of FIG. 2, schematically depicting the belt wrapping around a lower pulley in accordance with certain aspects of the present disclosure.

Each of the first and second tracks 20, 30 may have a plurality of apertures (e.g., apertures 21, 23 as shown in FIGS. 2A and 2B) spaced along the length of the track. Each of the first and second tracks 20, 30 may receive a bracket 24 slidable therealong. Each bracket 24 may be operatively engaged with a drive system 32 via a carrier 34 (e.g., as shown in FIGS. 2, 2A and 2B), such that each bracket 24 may be slidable along the length of the respective track and selectively moved upward and downward with a motor 28, which when operating moves the position of the carrier 34 (and thus the bracket 24) upon the respective track via the drive system 32. The drive system 32 may be a belt drive (with a pulley system including a plurality of pulleys), a cable drive, a chain drive, a screw drive, or a pneumatic/hydraulic drive system to automatically raise and lower the carrier 34 (and also the bracket 24 coupled to the carrier 34). In some embodiments, as shown in FIGS. 2-4, where the drive system 32 is a belt drive, the belt drive may include a belt 36 (e.g., a timing belt). The belt 36 (used inclusively herein to refer to a belt, a cable, or a chain) may be attached to the carrier 34 and may be wrapped around a lower pulley 38 proximate to the lower end 21*a* of the track and an upper pulley 40 (e.g., including upper pulleys 40*a*-40*c*) proximate to the upper end 21*b* of the track, and around the shaft 42 of a motor 28, such that rotation of the motor shaft 42 in a first direction causes the belt 36 to pull the carrier 34 (and thus the bracket 24 coupled to the carrier 34) upward, and operation of the motor 28 in the opposite second direction causes the belt 36 to pull the carrier 34 downward along the track, which allows the bracket 24 coupled to the carrier 34 to move downward together with the carrier 34.

Referring to FIGS. 2A and 2B, the bracket 24 may include first and second walls 44, 45 that each support fingers 46 that ride within the track 20, 30 that the bracket 24 is slidably mounted to. One of the first or second walls 44, 45 may be coupled to the carrier 34. In some embodiments, as shown in FIG. 2A, the second wall 45 of the bracket 24 may be configured to be coupled to a carrier 34 through a connector 68. One end of the belt 36 may be fixedly secured (e.g., by a set of screws or other suitable means) to the upper end 34*a* of the carrier 34, wrapped around a series of pulleys, and then the other end of the same belt 36 is attached to the bottom end 34*b* of the carrier 34 and thus forming a loop, such that motion of the belt 36 will cause the same motion of the carrier 34. In some embodiments, as shown in FIG. 2B, the second wall 45 of the bracket 24 may be configured to support a carrier 34 which includes a plurality of peaks 11 and valleys 13 that are configured to receive a drive belt 36 thereupon such that teeth of a drive belt 36 are received within the valleys 13 of the carrier 34 and therefore force upon the belt 36 causes the carrier 34 (and thus the bracket 24) to slide upwardly or downwardly upon the respective track 20, 30.

Figure 10:
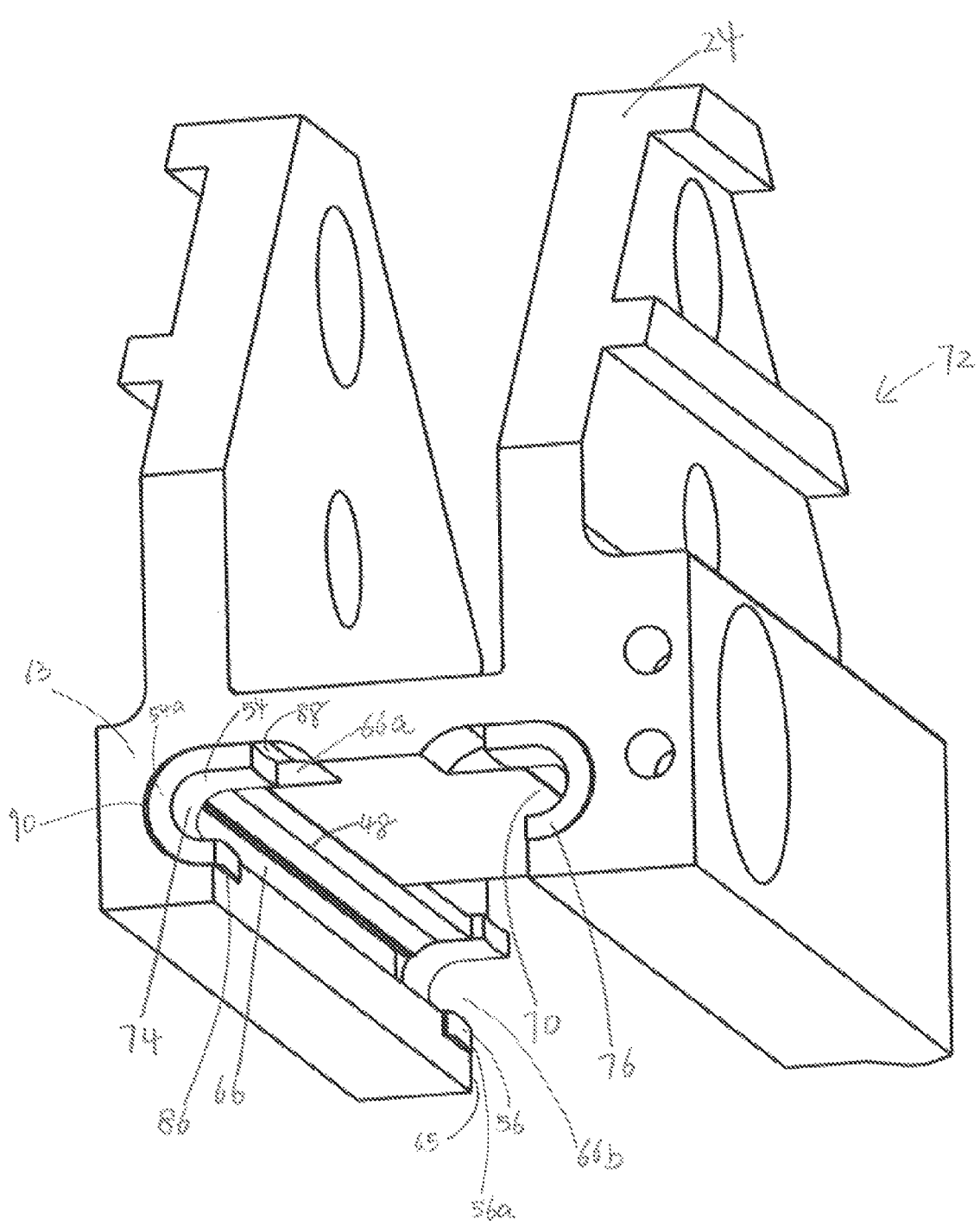
FIG. 10 is a perspective view of a bracket assembly including a bracket and two bushing components of FIG. 5 secured to the bracket in accordance with certain aspects of the present disclosure.
Figure 11:
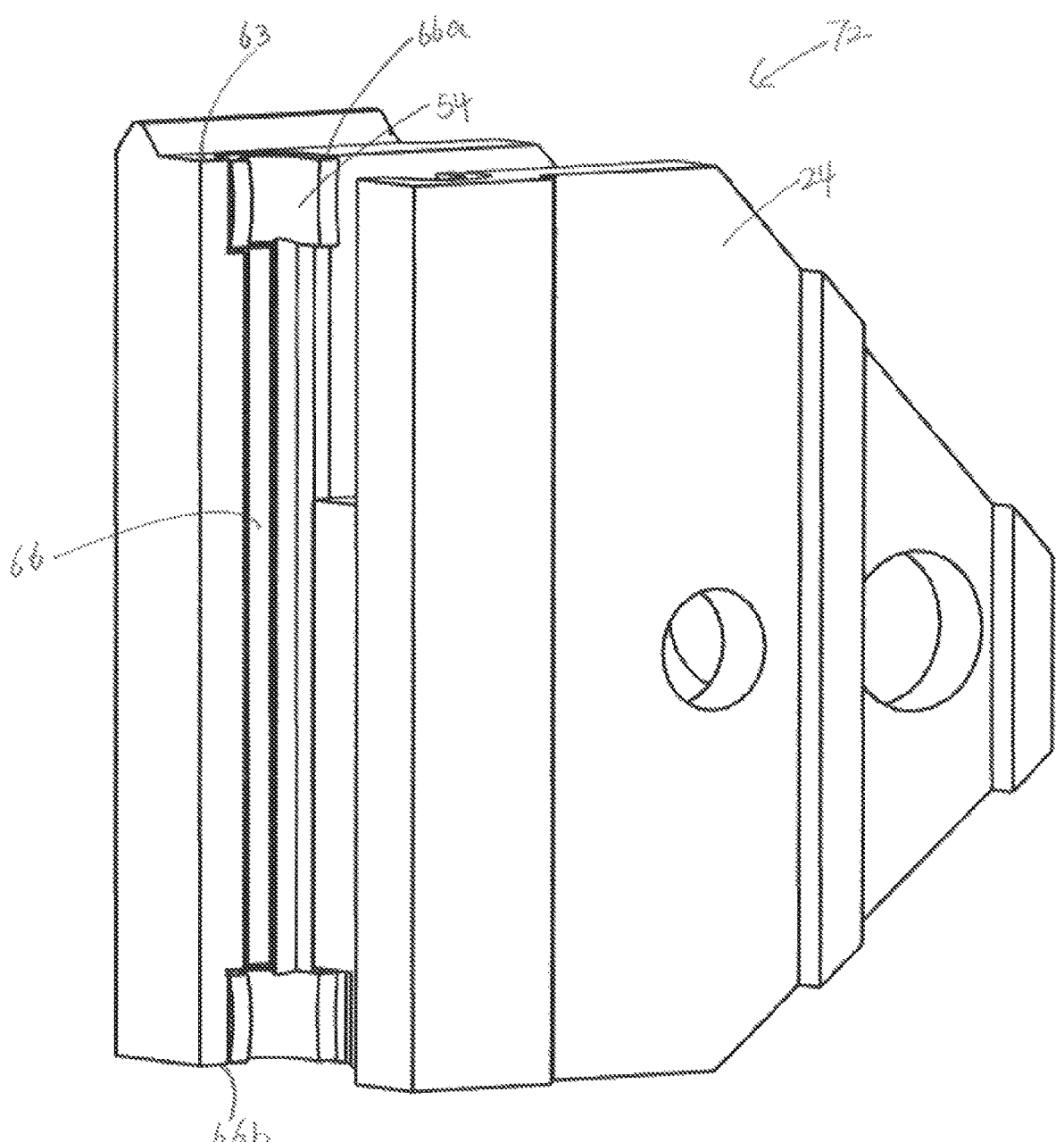
FIG. 11 is another perspective view of the bracket assembly of FIG. 10 in accordance with certain aspects of the present disclosure.
Figure 12:
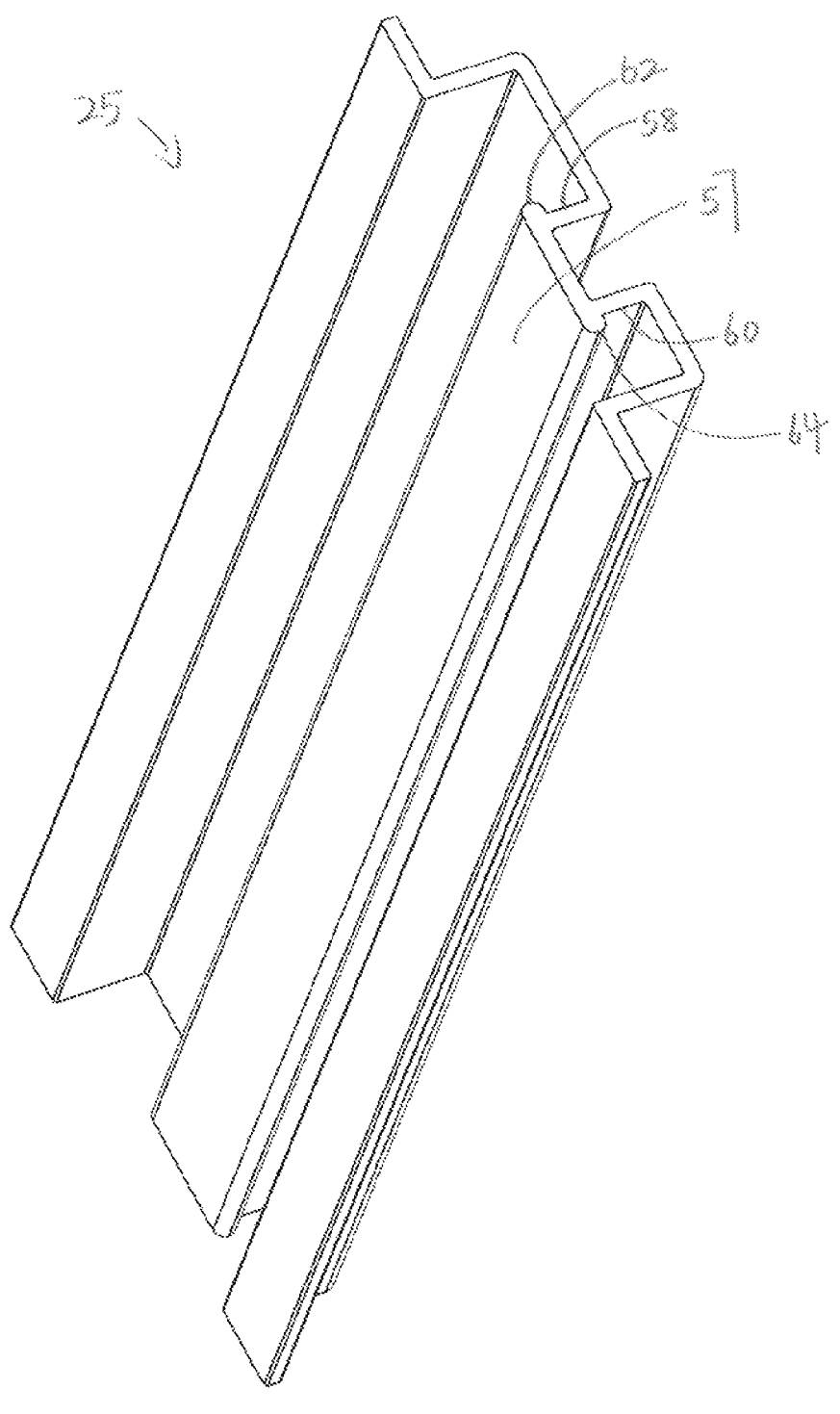
FIG. 12 is a perspective view of a track in accordance with certain aspects of the present disclosure.

In some embodiments, as shown in FIG. 12, a vertical track 25 may include a middle panel 57 connected to a first side panel 58 and a second side panel 60. The middle panel 57 may include a first edge 62 extending outwardly from the first side panel 58 and a second edge 64 extending outwardly from the second side panel 60. In some embodiments, as shown in FIGS. 10-15, the bracket 24 may be configured to slide along the vertical track 25. The bracket 24 may include a first groove 66 configured for slidably receiving the first edge 62 of the middle panel 57 of the vertical track 25 and a second groove 70 configured for slidably receiving the second edge 64 of the middle panel 57 of the vertical track 25. In some embodiments, the cross section of the first and second grooves 66 and 70 may have a generally half circle configuration, and the cross section of the first and second edges 62 and 64 of the middle panel 57 of the vertical track 25 may have a corresponding generally half circle configuration (e.g., as shown in FIGS. 10 and 12). When the bracket 24 is pulled up and down by the belt 36 upon the vertical track 25, the first groove 66 slides along at least a portion of the length of the first edge 62 of the middle panel 57 of the vertical track 25, and the second groove 70 slides along at least a portion of the length of the second edge 64 of the middle panel 57 of the vertical track 25.

Referring to FIGS. 5-17, in some embodiments, one or more bushing components 10 may be incorporated into the bracket 24, collectively forming a bracket assembly 72, to provide a wear surface between the bracket 24 and the vertical track 25 (e.g., between the first groove 66 of the bracket 24 and the first edge 62 of the middle panel 57 of the vertical track 25 and/or between the second groove 70 of the bracket 24 and the second edge 64 of the middle panel 57 of the vertical track 25) to reduce the wear of the vertical track 25 (e.g., the first and second edges 62 and 64) caused by the movement of the bracket 24 upon the vertical track 25, as discussed in greater detail below.

Figure 13:
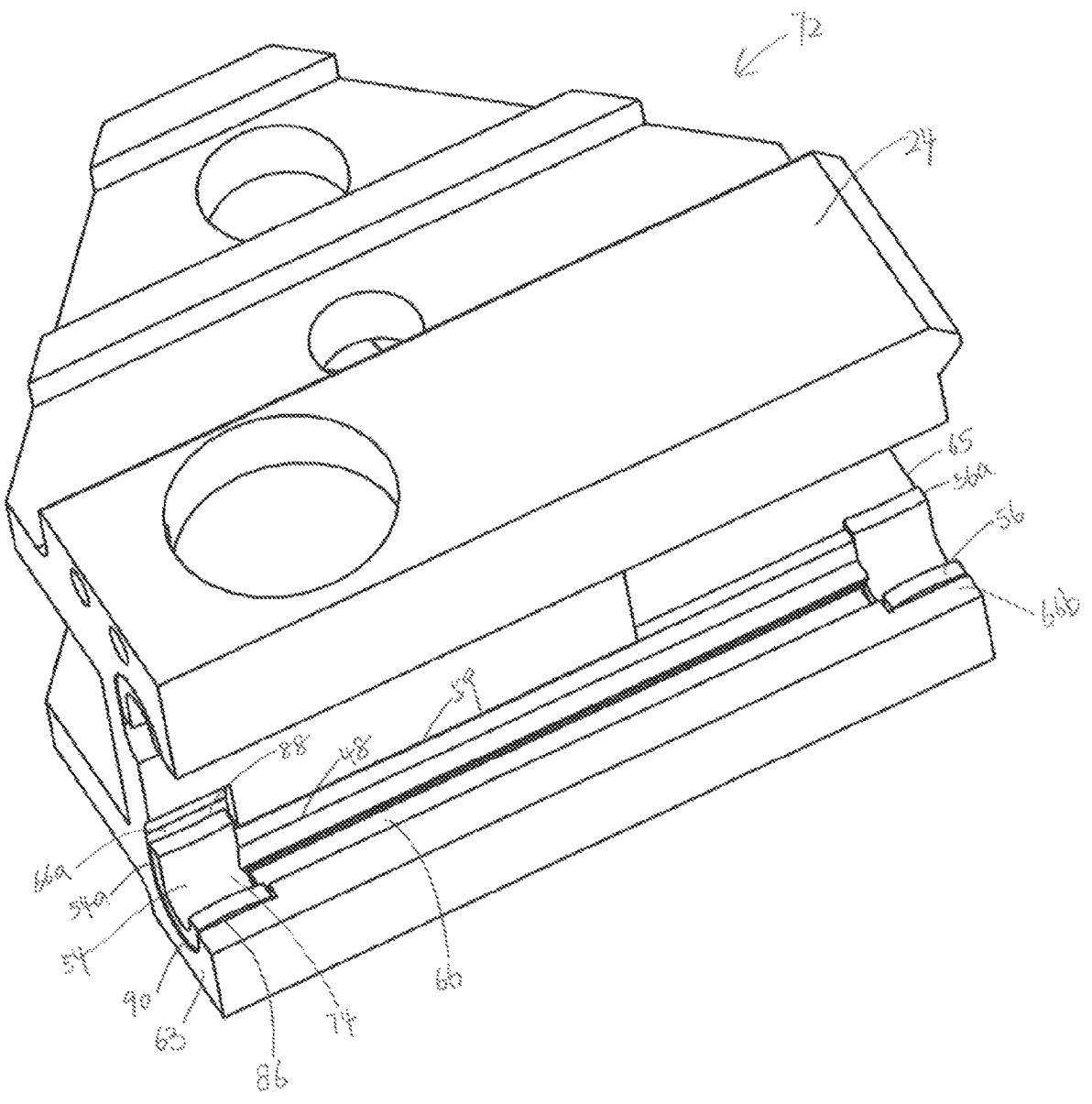
FIG. 13 is another perspective view of the bracket assembly of FIG. 10 in accordance with certain aspects of the present disclosure.
Figure 14:
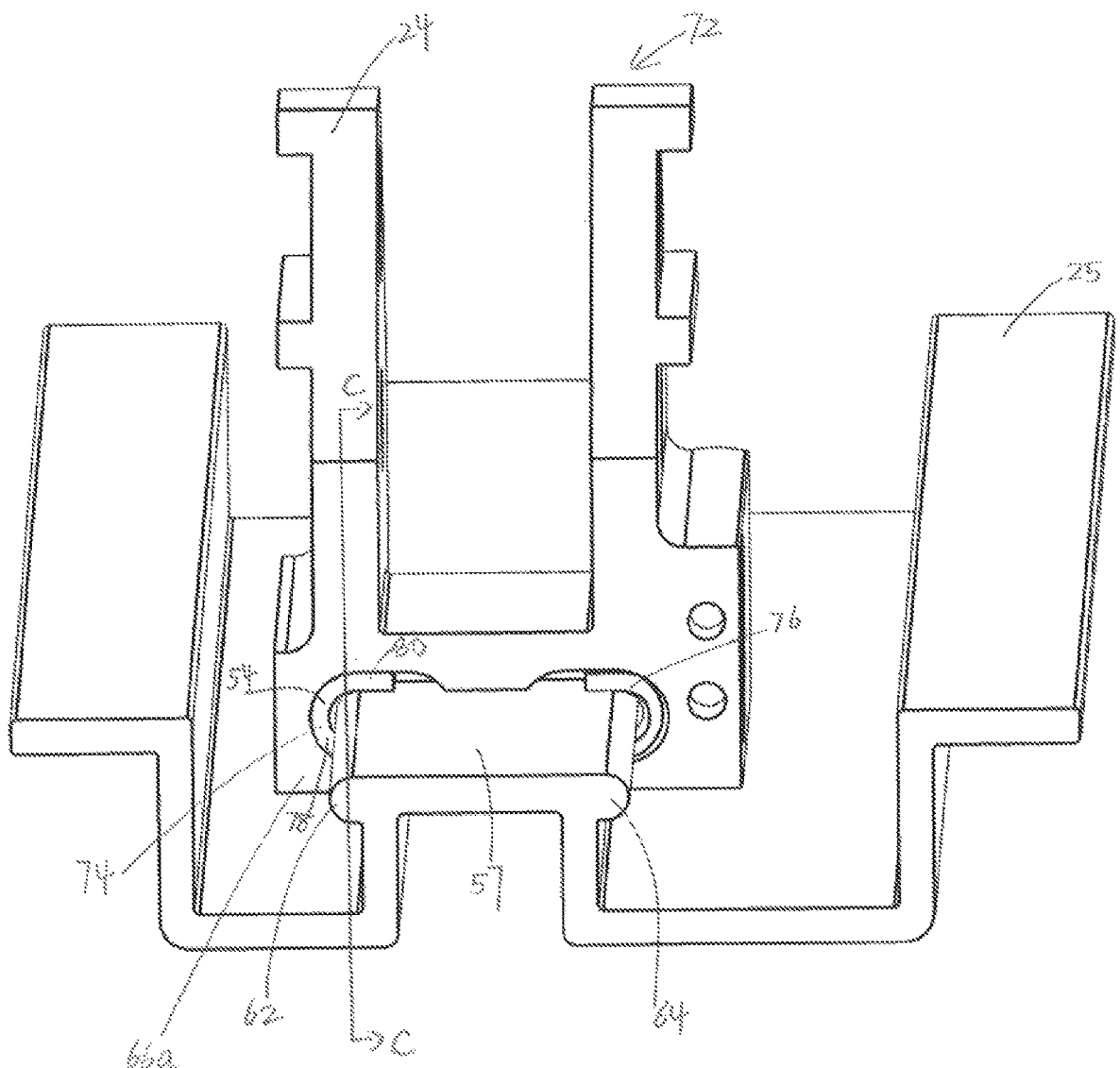
FIG. 14 is a perspective view showing a portion of the track of FIG. 12 slidably received in the bracket assembly of FIG. 10 in accordance with certain aspects of the present disclosure.
Figure 15:
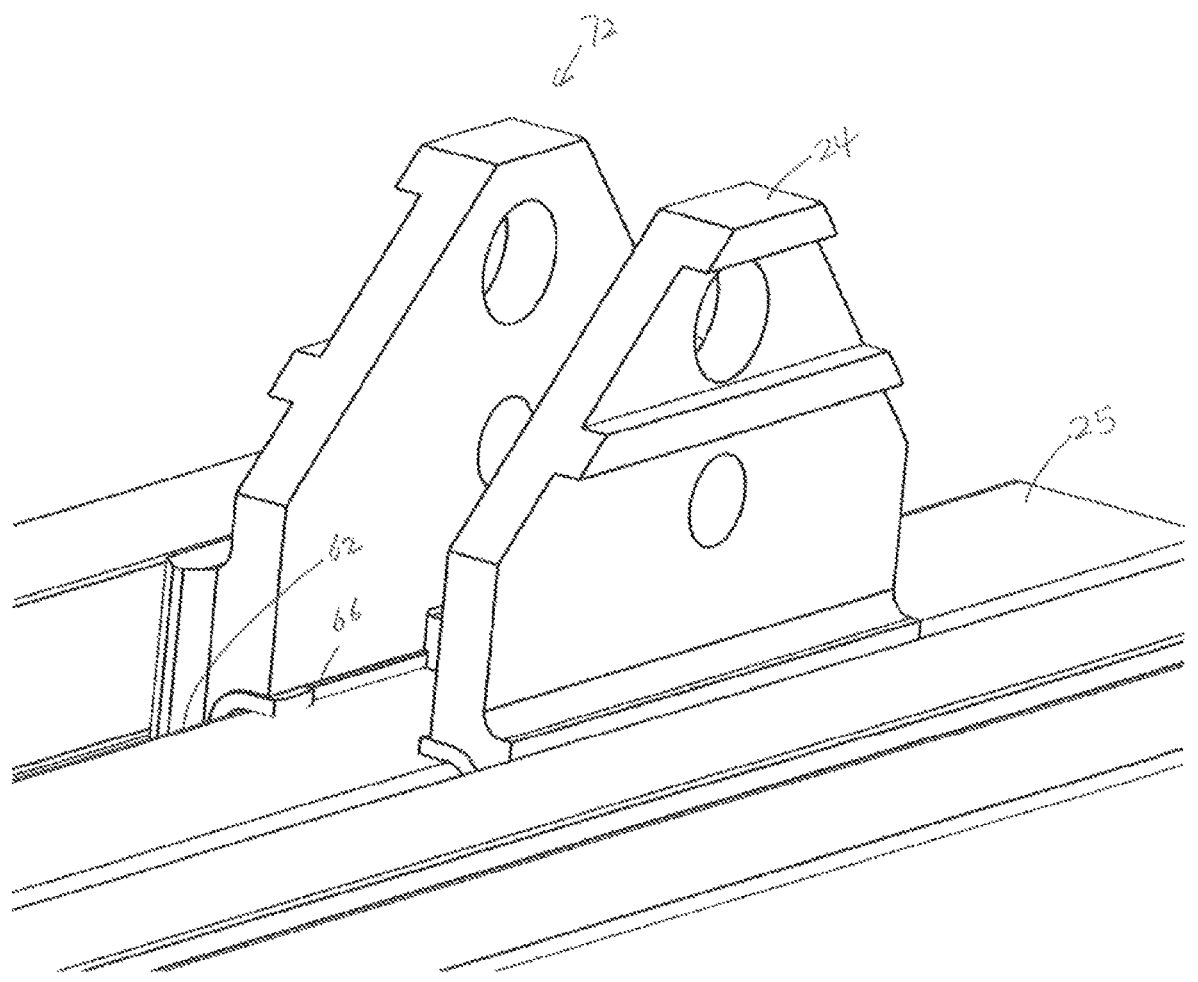
FIG. 15 is another perspective view showing a portion of the track of FIG. 12 slidably received in the bracket assembly of FIG. 10 in accordance with certain aspects of the present disclosure.

In some embodiments, as shown in FIGS. 10-15, the bracket assembly 72 may include the bracket 24, a first bushing component 74 disposed in the first groove 66 of the bracket 24, and a second bushing component 76 disposed in the second groove 70 of the bracket 24. As shown in FIGS. 13-15, the first bushing component 74 may be configured for slidably receiving at least a portion of the first edge 62 of the middle panel 57 of the vertical track 25, and the second bushing component 76 may be configured for slidably receiving at least a portion of the second edge 64 of the middle panel 57 of the vertical track 25. This configuration of the bracket assembly 72 is advantageous because the first and second bushing components 74 and 76 provide a closer contact between the bracket assembly 72 and the track 25, comparing to the contact between the bracket 24 (without the bushing components 74 and 76) and the track 25, which facilitates the bracket assembly 72 moving up and down straight upon the track 25, when the bracket assembly 72 is pulled by the belt 36 operatively coupled to the first wall 44 or the second wall 45 of the bracket 24 via the carrier 34, thereby reducing the wear of the track 25 caused by one side of the bracket 24 pivoting against the track 25.

In some embodiments, as shown in FIGS. 5-11, the bushing component 10 may include an elongated portion 48 extending between a first end 50 and a second end 52. The bushing component 10 may also include a first curved portion 54 connected to the first end 50 and a second curved portion 56 connected to the second end 52. For the sake of brevity, the configuration of the bushing component 10 will be specifically described with respect to the first groove 66 of the bracket 24, and one of ordinary skill in the art, with a thorough review of the subject specification and figures, will readily comprehend how the bushing component 10 may be configured to accommodate the configuration of the second groove 70 in order to provide a wear surface between the second groove 70 and the vertical track, while the second groove 70 may or may not have the same configuration as the first groove 66.

In some embodiments, the first and second curved portions 54 and 56 of the bushing component 10 may be configured to be received in first and second end portions 66a, 66b of the first groove 66 of the bracket 24, respectively (e.g., as shown in FIG. 11), when the bushing component 10 is disposed in the first groove 66 of the bracket 24. As shown in FIGS. 10 and 13, the first end portion 66a of the first groove 66 of the bracket 24 may include a first side inner surface 86 and a second side inner surface 88 that are connected through a middle side surface 90 such that the cross section of the first end portion 66a of the first groove 66 has a generally half circle configuration, as discussed above. The bushing component 10 may be configured such that when the elongated portion 48 is attached to a middle inner surface 59 disposed between the first and second end portions 66a and 66b of the first groove 66, the first curved portion 54 is received within the first end portion 66a of the first groove 66 with the first outer surface 54a of the first curved portion 54 being generally flush with the first end surface 63 of the first groove 66, and the second curved portion 56 is received within the second end portion 66b of the first groove 66 with the second outer surface 56a of the second curved portion 56 being generally flush with the second end surface 65 of the first groove 66. In some embodiments, the elongated portion 48 may be attached to the middle inner surface 59 by adhesives, welding or any other suitable attachment methods. In some embodiments, the elongated portion 48 may be releasably attached to the middle inner surface 59 such that the bushing component 10 may be replaced if it wears.

Figure 5:
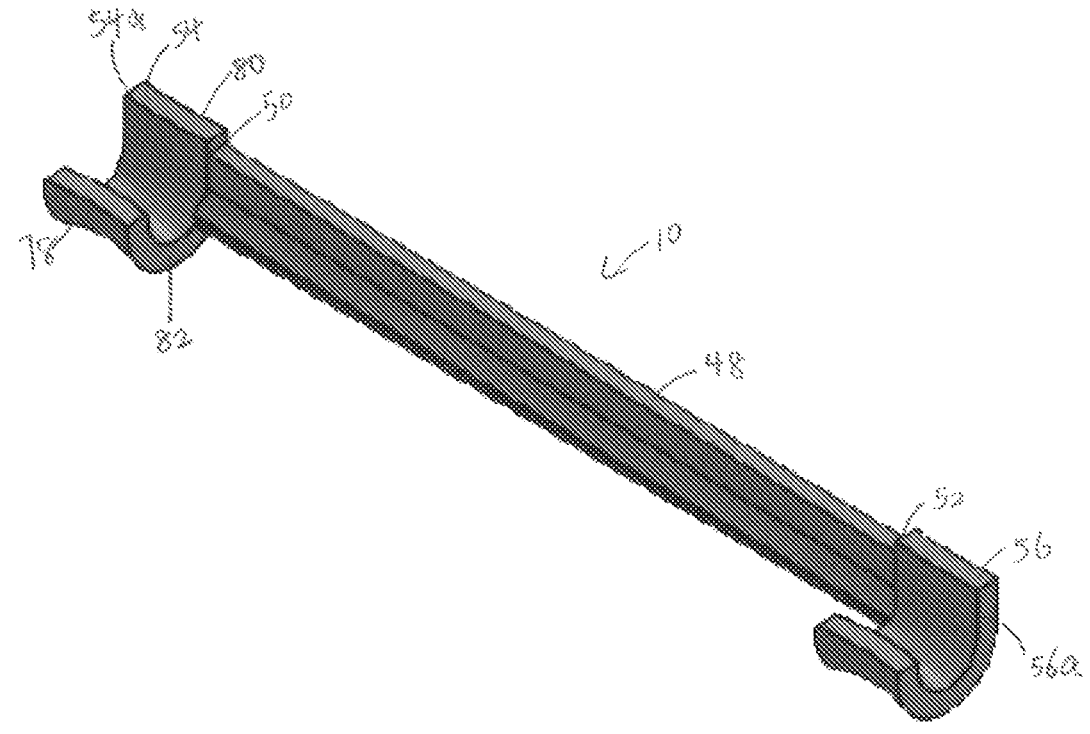
FIG. 5 is a perspective view of a bushing component in accordance with certain aspects of the present disclosure.
Figure 6:
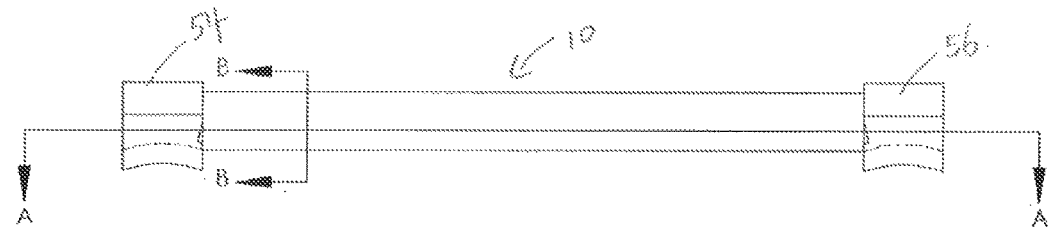
FIG. 6 is a front view of the bushing component of FIG. 5.
Figure 7:
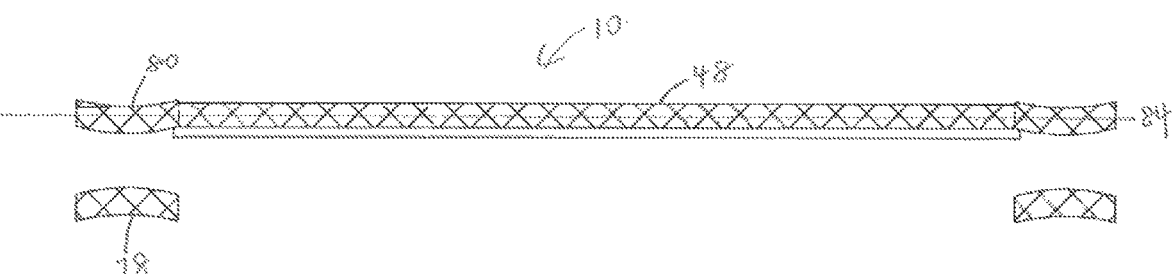
FIG. 7 is a cross-sectional view of the bushing component of FIG. 5 along the cut line A-A shown in FIG. 6.
Figure 8:
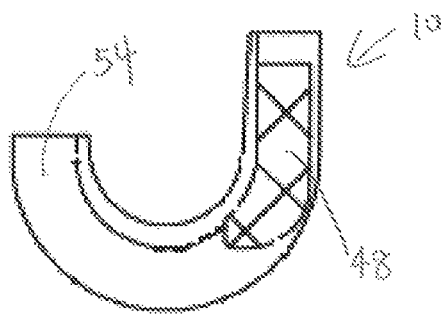
FIG. 8 is a cross-sectional view of the bushing component of FIG. 5 along the cut line B-B shown in FIG. 6.
Figure 9:
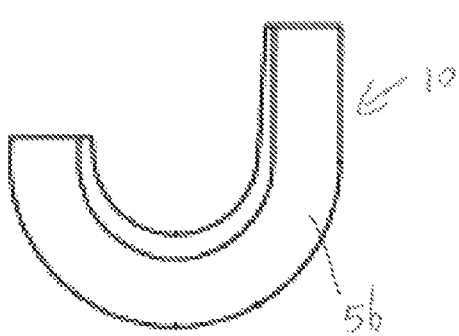
FIG. 9 is a side view of the bushing component of FIG. 5.

In some embodiments, each of the first and second curved portions 54, 56 of the bushing component 10 may have a same U-shaped or J-shaped configuration (e.g., nearly half circle), including a first side portion and a second side portion that are connected together through a middle portion. For the sake of brevity, the configuration of the first curved portion 54 will be specifically described with respect to the first end portion 66a of the first groove 66, and one of ordinary skill in the art, with a thorough review of the subject specification and figures, will readily comprehend how the second curved portion 56 may be configured to be received in the second end portion 66b of the first groove 66. In some embodiments, as shown in FIGS. 5-7, the first curved portion 54 may have a U-shaped or J-shaped configuration (e.g., nearly half circle), including a first side portion 78 and a second side portion 80 that are connected together through a middle portion 82. The second side portion 80 may extend outwardly from the first end 50 of the elongated portion 48 along a longitudinal axis 84 of the elongated portion 48.

In some embodiments, the bushing component 10 may be made from Polyoxymethylene (POM), Nylon 66, or any other suitable materials such that each of the first and second curved portions 54, 56 may be translatable between a first configuration (e.g., default configuration, when no force is applied thereon) and a second configuration (e.g., when force is applied thereon). In the first configuration, the first and second side portions of each of the first and second curved portions 54, 56 of the bushing component 10 may be curved toward each other, such that when the first and second curved portions 54, 56 of the bushing component 10 are received in the first groove 66 of the bracket 24, spaces may be formed between the first and second side portions of each of the first and second curved portions 54, 56 and the respective end portions 66a, 66b of the first groove 66 of the bracket 24. When the first edge 62 of the vertical track 25 is slidably received within the first groove 66 of the bracket 24, the first edge 62 of the vertical track 25 may engage the first and second curved portions 54, 56 of the bushing component 10 disposed in the first groove 66 of the bracket 24 and compress the first and second side portions of each of the first and second curved portions 54, 56 of the bushing component 10 towards the first groove 66 of the bracket 24 such that each of the first and second curved portions 54, 56 is translated into the second configuration. When each of the first and second curved portions 54, 56 is in the second configuration, less or no space (e.g., less space than the in the first configuration) may be formed between the first and second side portions of each of the first and second curved portions 54, 56 of the bushing component 10 and the respective end portions 66a, 66b of the first groove 66 of the bracket 24.

For example, as shown in FIGS. 5 and 7, when the first curved portion 54 is in the first configuration (e.g., default configuration, when no force is applied to the first curved portion 54), the first and second side portions 78 and 80 may be curved towards each other. When the first curved portion 54 is received within the first end portion 66a of the first groove 66 of the bracket 24, as shown in FIG. 13, the elongated portion 48 may be attached to the middle inner surface 59 of the first groove 66, the middle portion 82 of the first curved portion 54 may contact the middle side surface 90 of the first end portion 66a of the first groove 66, the first side portion 78 of the first curved portion 54 may be disposed adjacent to the first side inner surface 86 of the first groove 66 while leaving space therebetween due to the curved configuration of the first side portion 78, and the second side portion 80 of the first curved portion 54 may be disposed adjacent to the second side inner surface 88 of the first groove 66 while leaving space therebetween due to the curved configuration of the second side portion 80 (e.g., as shown in FIGS. 11 and 13).

Figure 16:
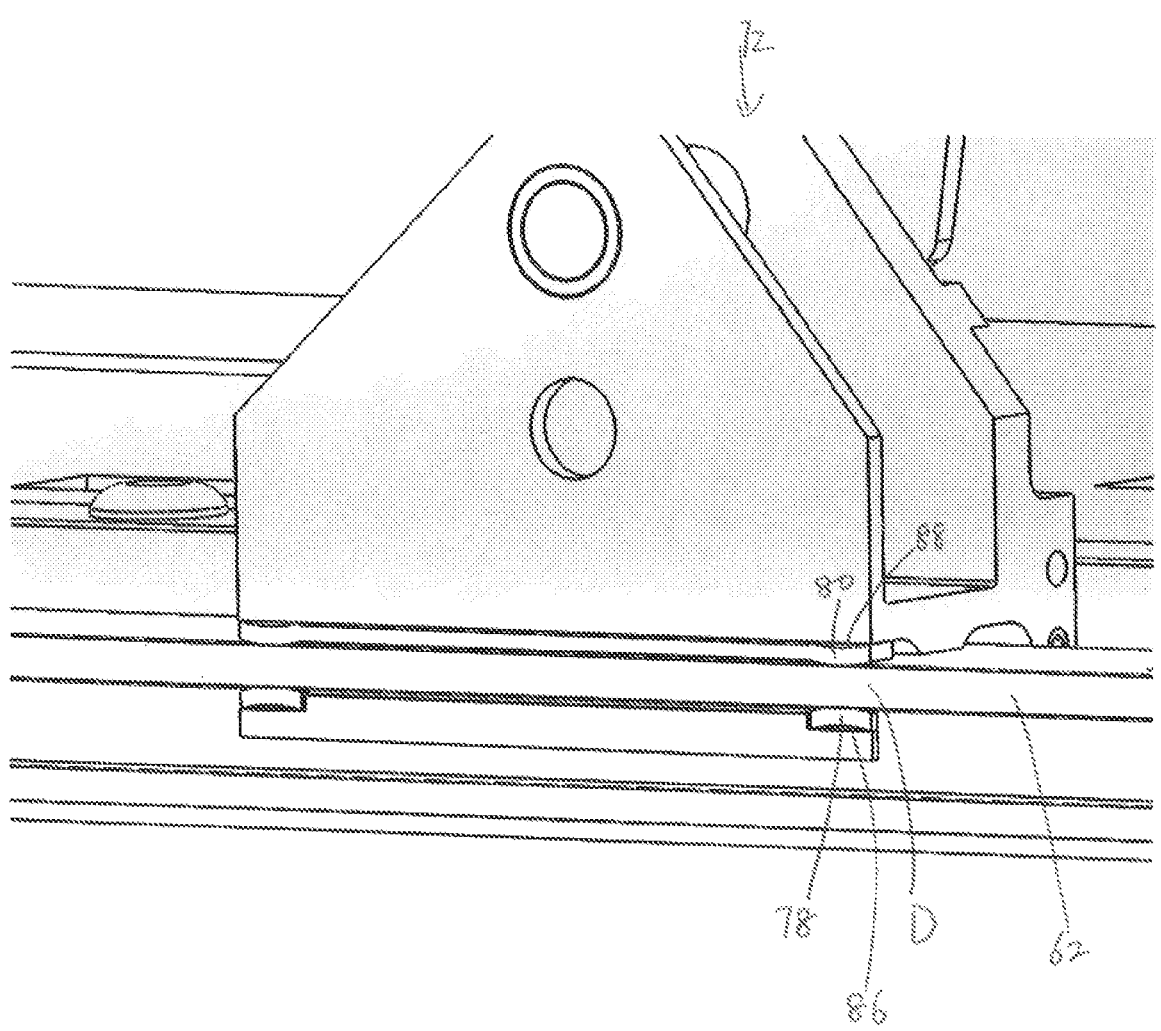
FIG. 16 is a cross-sectional view of the bracket assembly of FIG. 10 with a portion of the track of FIG. 12 slidably received therein along the cut line C-C shown in FIG. 14.
Figure 17:
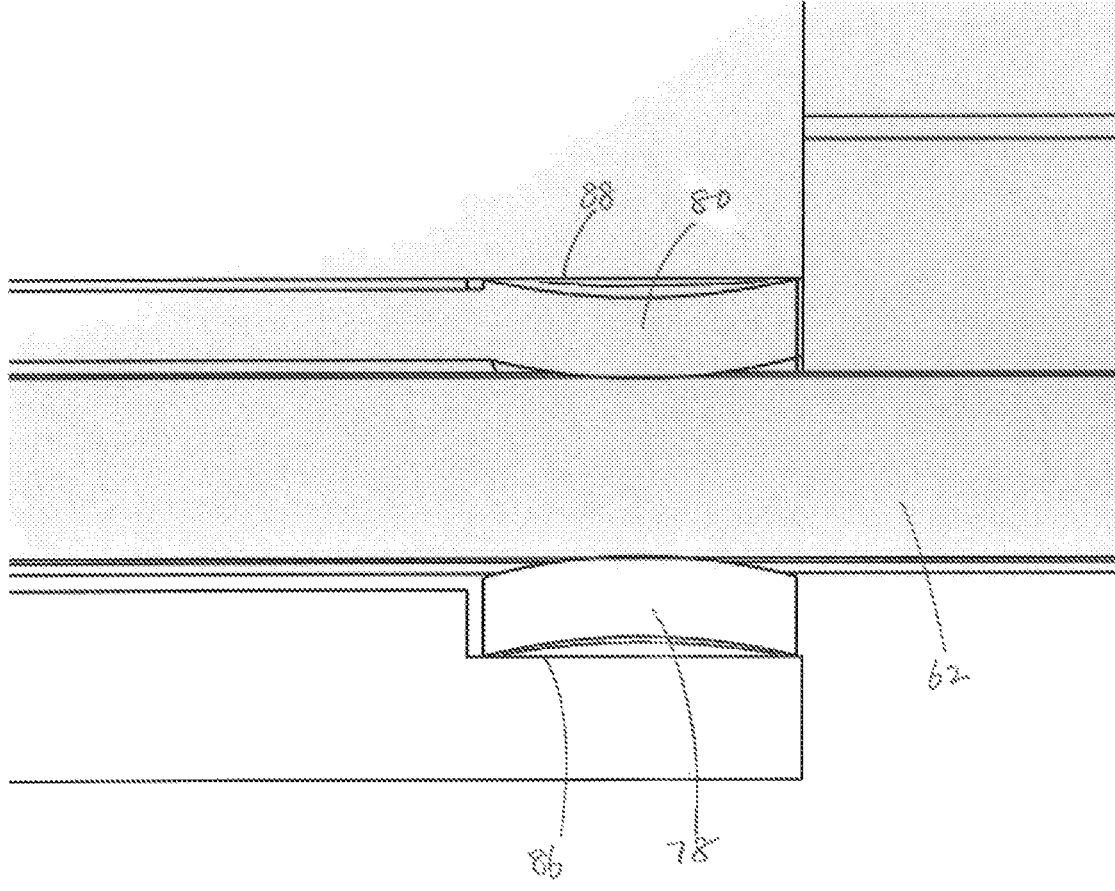
FIG. 17 is a detail view of detail D of FIG. 16.

The first curved portion 54 may be translated from the first configuration into a second configuration when force is applied radially outwardly to the first and second side portions 78 and 80. In some embodiments, as shown in FIGS. 14-17, when the first edge 62 of the track 25 is slidably received in the first groove 66 of the bracket 24, the first edge 62 of the track 25 engages the first and second side portions 78 and 80 of the first curved portion 54 of the bushing component and compresses the first and second side portions 78 and 80 towards the first and second side inner surfaces 86 and 88 (e.g., applying radially outward force on the first and second side portions 78 and 80 because the distance between the inwardly curved first and second side portions 78 and 80 is configured to be slightly smaller than the diameter of the generally half circle cross section of the first edge 62 of the track 25), respectively, such that the first curved portion 54 is translated into the second configuration. In some embodiments, when the first curved portion 54 is in the second configuration, it may have a generally half circle configuration, where the first and second side portions 78 and 80 engage the respective first and second side inner surfaces 86 and 88 with little to no space formed therebetween (e.g., as shown in FIG. 14), while in some embodiments, when the first curved portion 54 is in the second configuration, the first and second side portions 78 and 80 may still curve towards each other with a larger distance therebetween due to the first edge 62 of the track 25 disposed therebetween (e.g., as shown in FIGS. 16 and 17).

It will be appreciated that the configuration (e.g., shape, dimension) of the first and second grooves 66 and 70 of the bracket 24, the configuration of the first and second edges 62 and 64 of the vertical track 25, and the configuration of the first and second curved portions 54 and 56 of the bushing component 10 may be varied as desired and/or needed without departing from the scope of the present invention, as long as they are configured such that when bushing components 10 are respectively disposed in the first and second grooves 66 and 70 of the bracket 24, the first and second edges 62 and 64 of the vertical track 25 may be slidably received within the first and second grooves 66 and 70 of the bracket 24, respectively, with the first and second edges 62 and 64 of the vertical track 25 respectively engaging the first and second curved portions 54 and 56 of the bushing components 10 respectively disposed in the first and second grooves 66 and 70 of the bracket 24, such that the first and second curved portions 54 and 56 of the bushing components 10 are translated from a first default configuration to a second radially outwardly expanding configuration, as discussed above.

The ability to translate from the first configuration to the second configuration of the first and second curved portions 54, 56 of the bushing component 10 is advantageous for providing a tight contact between the first edge 62 of the track 25 and the bracket assembly 72, which allows the bracket assembly 72 to move up and down straight upon the vertical track 25 while minimizing relative movement of the bracket assembly 72 in other directions, thereby reducing the wear of the track 25 caused by the relative movement of the bracket 24 upon the vertical track 25 in other directions.

Figure 18:
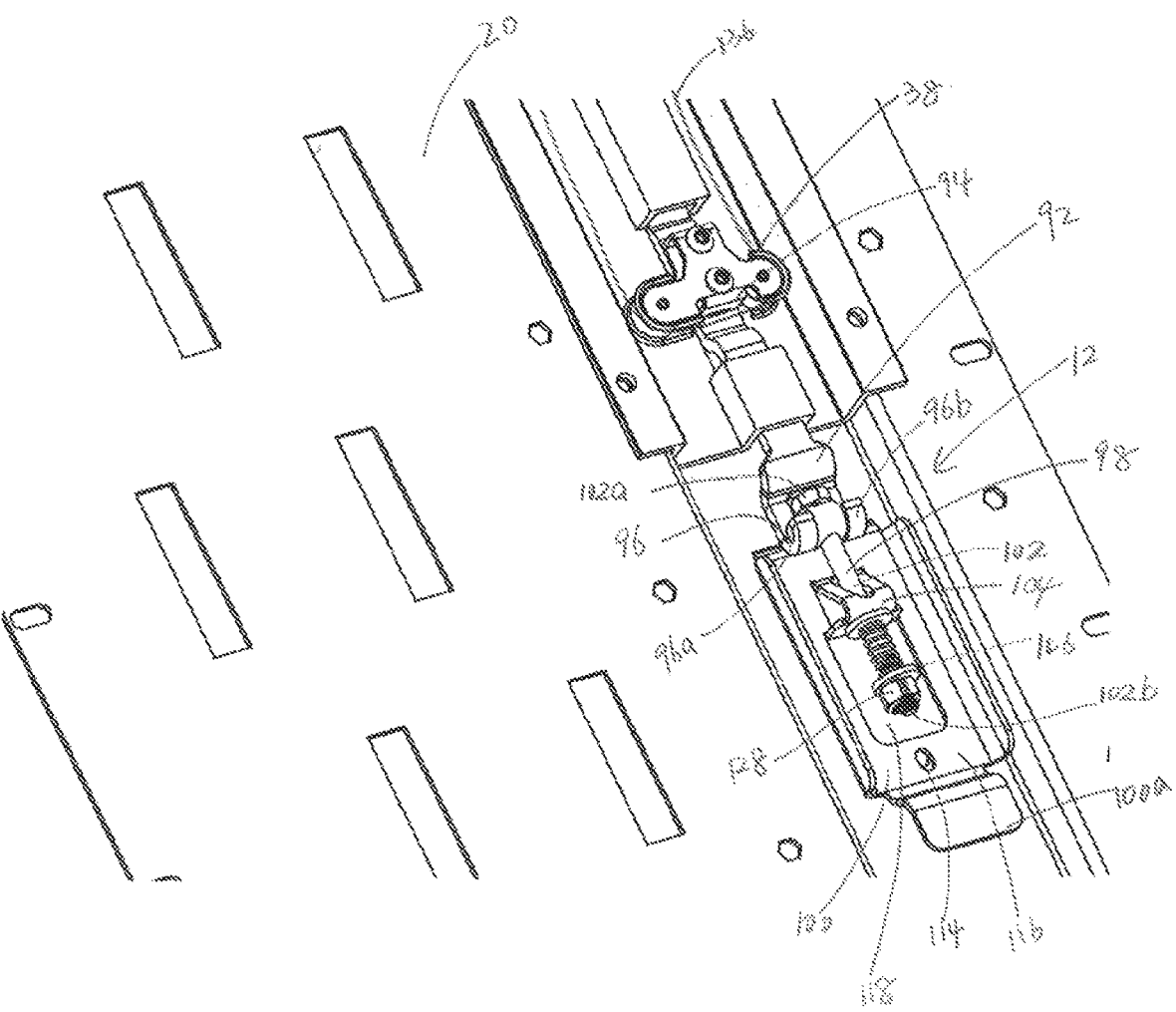
FIG. 18 is an enlarged perspective view of the lower pulley of FIG. 4 with a belt tension system in a first position in accordance with certain aspects of the present disclosure.
Figure 19:
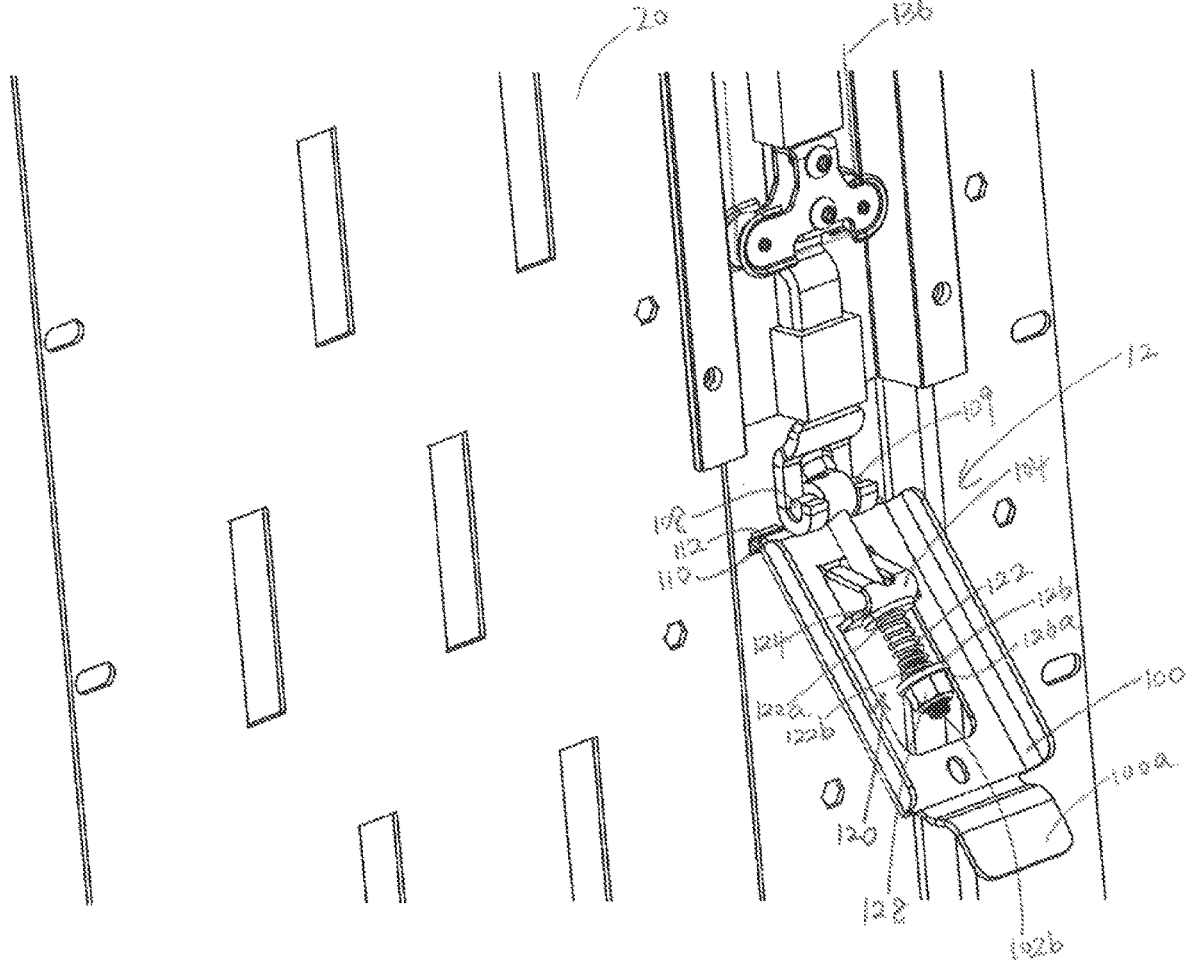
FIG. 19 is an enlarged perspective view of the lower pulley of FIG. 4 with a belt tension system in a second position in accordance with certain aspects of the present disclosure.

Referring to FIGS. 2, 4, 18 and 19, in some embodiments, a captive beam system, such as remotely adjustable captive beam system, may include a tension system 12 configured for selectively adjusting tension of the belt 36 of the belt drive system. In some embodiments, as shown in FIGS. 18 and 19, the tension system 12 may include a first connector 92, a second connector 98, and a frame 100. The first connector 92 may be securely coupled to the lower pulley 38 and extending downwardly along the track 20 from an upper end portion 94 to a lower end portion 96. In some embodiments, as shown in FIGS. 18 and 19, the lower end portion 96 may include a set of fingers 96a and 96b having a generally J-shaped configuration. The second connector 98 may be configured to rotatably couple to the first connector 92 and securely couple to the frame 100. The frame 100 may be configured to pivotably couple to the track 20.

In some embodiments, as shown in FIGS. 18 and 19, the second connector 98 may include an elongated component 102 extending between a first end portion 102a and a second end portion 102b. The first end portion 102a may include a first wing 108 and second wing 109 extending radially outwardly from the elongated component 102 and configured to be rotatably received in the set of fingers 96a and 96b of the first connector 92. In some embodiments, the first and second wings 108 and 109 may have a generally cylindrical configuration and spaced apart 180 degrees. In some embodiments, the second end portion 102b of the elongated component 102 may have a generally cylindrical configuration with threads formed on the outer surface.

In some embodiments, as shown in FIGS. 18 and 19, the frame 100 may be pivotably coupled to the track 20 and disposed below the lower end portion 96 of the first connector 92, such as via one or more hooks 110 extending through one or more holes 112 on the track 20. The frame 100 may be securely coupled to the track 20, such as via a set screw 114 (e.g., as shown in FIG. 18) or other suitable means. The frame 100 may include a planar portion 116 having a cutout 118 and a middle component 104 extending outwardly from the planar portion 116 above at least a portion of the cutout 118. The middle component 104 and the cutout 118 are configured such that the second connector 98 may extend downwardly through the middle component 104 into the cutout 118.

In some embodiments, as shown in FIGS. 18 and 19, a bias component 120 may be provided and configured to threadably engage the second end portion 102b of the elongated component 102. The bias component 120 may include a spring 122 extending between a first end 122a and a second end 122b. A first washer 124 may be coupled to the first end 122a of the spring 122 and a second washer 126 may be coupled to the second end 122b of the spring 122. The second end portion 102b of the elongated component 102 may extend through the first washer 124, the spring 122, and the second washer 126, such that the first washer 124 contacts the middle component 104. A nut 128 may be provided to threadably engage the second end portion 102b of the elongated component 102 and contact the bottom surface of the second washer 126, such that rotating the nut 128 in a first direction (e.g., clockwise direction) may cause the nut 128 to move upwardly along the length of the elongated component 102 and secure to a desired position by engaging the threads on the outer surface of the second end portion 102b of the elongated component 102, and rotating the nut 128 in an opposite second direction (e.g., counter-clockwise direction) may cause the nut 128 to move downwardly along the length of the elongated component 102 and secure to a desired position by engaging the threads on the outer surface of the second end portion 102b of the elongated component 102.

When the nut 128 moves up and secures to a higher position on the second end portion 102b of the elongated component 102, the distance between the first and second washers 124 and 126 is shortened, such that the first washer 124 may be biased against the middle component 104 by the spring 122, and thereby applying upward force to the lower pulley 38, which may reduce the tension on the belt 136 wrapping around the lower pulley 38. As the second washer 126 moves closer to the first washer 124 by rotating the nut in the first direction, greater upward force may be applied to the lower pulley 38 such that the tension on the belt 136 may be further reduced. When the nut 128 moves down and secures to a lower position on the second end portion 102b of the elongated component 102, the distance between the first and second washers 124 and 126 (and thus the distance between the first and second ends 122a and 122b of the spring 122) is lengthened, such that the upward biasing force applied to the middle component 104 by the first washer 124 biased by the spring 122 may be reduced, which may cause the tension on the belt 136 wrapping around the lower pulley 38 to increase. As the second washer 126 moves further away from the first washer 124 by rotating the nut in the second direction, less upward force may be applied to the lower pulley 38 such that the tension on the belt 136 may be further increased. In use, a user may first lift the lower end portion 100a of the frame 100 up and away from the track 20 (e.g., as shown in FIG. 19), and then rotating the nut 128 in a desired direction such that the tension on the belt 136 wrapping around the lower pulley 38 is adjusted, as desired.

After adjusting the tension on the belt 136 and securing the nut 128 in a desired position on the second end portion 102b of the elongated component 102, the user may then move the frame 100 towards the track 20 and secure the frame 100 to the track 20 (e.g., via the set screw 114, as shown in FIG. 18).

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

I claim:

1. A bushing component for reducing wear in a decking system, including a vertical track configured to be installed upon a wall of a cargo compartment and a bracket configured to slide along the vertical track, comprising:

an elongated portion extending between a first end and a second end;

a first curved portion connected to the first end; and a second curved portion connected to the second end, wherein the bushing component is configured to be disposed in a groove of a bracket and configured for slidably receiving at least a portion of a vertical track slidably received in the groove of the bracket.

2. The bushing component of claim 1, wherein the first and second curved portions are configured to be received in two end portions of the groove of the bracket.

3. The bushing component of claim 1, wherein each of the first and second curved portions has a U-shaped or J-shaped configuration including a first side portion and a second side portion that are connected through a middle portion.

4. The bushing component of claim 1, wherein each of the first and second curved portions is translatable between a first configuration and a second configuration.

5. The bushing component of claim 4, wherein in the first configuration, the first and second side portions of each of the first and second curved portions are curved toward each other, such that when the first and second curved portions of the bushing component are received in the groove of the bracket, spaces are formed between the first and second side portions of each of the first and second curved portions and the respective end portions of the groove of the bracket.

6. The bushing component of claim 5, wherein when the vertical track is slidably received within the groove of the bracket, at least a portion of the vertical track engages the first and second curved portions of the bushing component disposed in the groove of the bracket and compresses the first and second side portions of each of the first and second curved portions of the bushing component towards the groove of the bracket such that each of the first and second curved portions is translated into the second configuration.

7. The bushing component of claim 6, wherein when each of the first and second curved portions is in the second configuration, no space is formed between first and second side portions of each of the first and second curved portions and the respective end portions of the groove of the bracket.

* * * * *